United States Patent
Wong

(10) Patent No.: US 9,767,219 B2
(45) Date of Patent: Sep. 19, 2017

(54) AUTOMATIC DETECTION OF QUERIES MISSING ORDER-BY VIA UNIT TEST

(71) Applicant: Joseph Wong, Vancouver (CA)

(72) Inventor: Joseph Wong, Vancouver (CA)

(73) Assignee: SuccessFactors, Inc., San Francisco, CA (US)

( * ) Notice: Subject to any disclaimer, the term of this patent is extended or adjusted under 35 U.S.C. 154(b) by 263 days.

(21) Appl. No.: 14/524,803

(22) Filed: Oct. 27, 2014

(65) Prior Publication Data
US 2016/0117416 A1  Apr. 28, 2016

(51) Int. Cl.
*G06F 17/30* (2006.01)

(52) U.S. Cl.
CPC .............................. *G06F 17/30964* (2013.01)

(58) Field of Classification Search
CPC ......... G06F 17/30964; G06F 17/30979; G06F 11/263; G06F 11/36; G06F 17/30595; G06F 17/30082; G06F 17/30; G06F 17/30646; G06F 17/30864; G06F 17/3064; G06F 17/30563; G06F 17/30445; G06F 17/30554; G06F 17/30392; G06F 17/30424; G06F 17/3056; G06F 9/5027; G06F 2209/5021; G06F 17/30466; G06F 17/30436; H04L 67/10; H04L 65/403; G06Q 30/02
See application file for complete search history.

(56) References Cited

U.S. PATENT DOCUMENTS

| | | | | |
|---|---|---|---|---|
| 5,974,407 A * | 10/1999 | Sacks | ................ | G06F 17/30595 707/E17.014 |
| 7,062,502 B1 * | 6/2006 | Kesler | ................ | G06F 17/3056 707/805 |
| 7,401,094 B1 * | 7/2008 | Kesler | ................ | G06F 17/3056 707/805 |
| 7,680,781 B1 * | 3/2010 | Wasserman | ....... | G06F 17/30389 707/E17.015 |
| 7,761,439 B1 * | 7/2010 | Auerbach | ......... | G06F 17/30867 707/706 |
| 8,122,007 B2 * | 2/2012 | Mayer | ............... | G06F 17/30398 707/713 |
| 8,914,353 B2 * | 12/2014 | Dees | ................ | G06F 17/30466 707/714 |
| 2005/0044366 A1 * | 2/2005 | Pucheral | ........... | G06F 17/30477 713/172 |
| 2005/0097546 A1 * | 5/2005 | Johnson | ................ | G06F 8/4442 717/177 |
| 2005/0114206 A1 * | 5/2005 | Bennett | .................. | G06Q 30/02 705/14.55 |
| 2005/0278270 A1 * | 12/2005 | Carr | ....................... | G06Q 10/10 706/25 |
| 2006/0259457 A1 * | 11/2006 | Muras | ............... | G06F 17/30433 707/E17.104 |
| 2007/0244865 A1 * | 10/2007 | Gordon | ............... | G06F 17/3056 707/760 |

(Continued)

*Primary Examiner* — Anh Ly
(74) *Attorney, Agent, or Firm* — Mintz Levin Cohn Ferris Glovsky and Popeo, P.C.

(57) ABSTRACT

In one aspect, there is provided a method. The method may intercepting a result provided by a database in response to a query; modifying the intercepted result to enable detection of an order by problem; and detecting, based on the modified intercepted result, whether the query is missing an order by clause. Related systems, methods, and articles of manufacture are also disclosed.

20 Claims, 3 Drawing Sheets

(56) References Cited

U.S. PATENT DOCUMENTS

| | | | |
|---|---|---|---|
| 2008/0109691 A1* | 5/2008 | Dieffenderfer | G01R 31/3187 714/733 |
| 2008/0183688 A1* | 7/2008 | Chamdani | G06F 17/30442 707/E17.017 |
| 2009/0031230 A1* | 1/2009 | Kesler | G06F 17/3056 707/E17.014 |
| 2009/0063458 A1* | 3/2009 | Beavin | G06F 17/30486 707/E17.017 |
| 2012/0124063 A1* | 5/2012 | Wong | G06F 17/30427 707/754 |
| 2012/0143896 A1* | 6/2012 | Gatter | G06F 17/30684 707/769 |
| 2013/0159285 A1* | 6/2013 | Dees | G06F 17/30466 707/718 |
| 2013/0238637 A1* | 9/2013 | Gupte | G06F 17/30451 707/752 |
| 2014/0032588 A1* | 1/2014 | Getmanets | G06F 17/30592 707/760 |
| 2014/0201194 A1* | 7/2014 | Reddy | G06F 17/30554 707/722 |
| 2015/0039591 A1* | 2/2015 | Ding | G06F 17/30979 707/722 |
| 2015/0112952 A1* | 4/2015 | Zhou | G06F 17/30123 707/694 |
| 2016/0117416 A1* | 4/2016 | Wong | G06F 17/30964 707/722 |
| 2016/0117417 A1* | 4/2016 | Wong | G06F 17/30979 707/713 |

* cited by examiner

AUTOMATIC DETECTION OF QUERIES MISSING ORDER-BY VIA UNIT TEST

TECHNICAL FIELD

The subject matter described herein relates generally to data processing.

BACKGROUND

Software testing may be performed to determine whether code operates properly. For example, unit testing may be performed to test whether certain code modules work together given data and other operational conditions. Test script may be written to test one or more specific aspects of the modules and their behavior. To perform unit test, test script may be run to test and monitor the behavior of the modules before the modules are further integrated with other modules and/or released as operational.

SUMMARY

In one aspect, there is provided a method. The method may include intercepting a result provided by a database in response to a query; modifying the intercepted result to enable detection of an order by problem; and detecting, based on the modified intercepted result, whether the query is missing an order by clause.

In some variations, one or more of the features disclosed herein including the following features can optionally be included in any feasible combination. The query sent to the database may be intercepted. The intercepted query may be modified to enable detection of the order by problem. The modified, intercepted query may be forwarded to the database. The detecting may further include modifying the result to cause an exception to be thrown, when accessed with an order-sensitive operation. The database may include a database management system that makes default sort order guarantees. The database may include a column-store database. The order by clause may order the result of the query based on one or more columns of the database. The modifying may include reversing the order of the intercepted result. The query may include a select query.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to an enterprise resource software system or other business software solution or architecture, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

The order by instruction is a database instruction used in conjunction with a select instruction to return a result set in a certain order (for example, the rows of the result set being sorted in accordance with the values found in one or more corresponding columns). For example, a select of employees (for example, SELECT*FROM Employees) may be ordered by a last name (for example, ORDER BY LastName, which is a column of the database).

In some frameworks, some databases may return results in a particular sorted order even when the query did not specify a sort order, but some databases, such as column-store databases as well as other types of databases, may not make such default sort order guarantees. When the database does not employ a default sort order, a result set may be being returned in an arbitrary order (for example, whatever order the data was stored in the database, or the arbitrary combination of partial results as computed by parallel processes within the database). This may cause issues and, more importantly, errors during execution of some queries, especially if the result set was expected to have some ordering.

The subject matter disclosed herein may provide an automated way of detecting database queries that may cause errors or other issues due to order by uncertainties. For example, certain databases (for example, MySQL and the like) tend to return results in a particular sorted order even when the query did not explicitly specify a sort order via the order by instruction. Some applications rely on this sorted order behavior and issue database queries that do not explicitly call for order by instruction, even when these applications require the query result set to be sorted. As such, the out-of-order query result set may cause errors (for example, throw exceptions) when the database does not provide the result set in order. The subject matter disclosed herein provides a way to detect queries that may cause these order by related errors.

Figure 1:
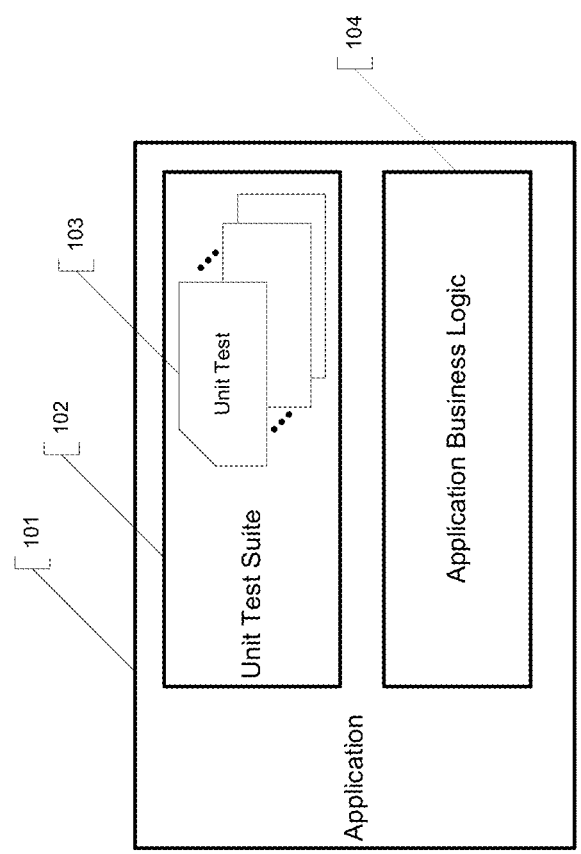
FIG. 1 depicts an example of an application under unit test, in accordance with some example implementations.

FIG. 1 depicts an example of an application 101 and its corresponding logic 104 (for example, program code, script, business logic, and/or the like). The logic 104 may be tested for correctness and, more particularly, the above-noted order by issue. FIG. 1 also depicts a unit test suite 102 including one or more unit tests, such as unit test 103 and the like.

Figure 2:
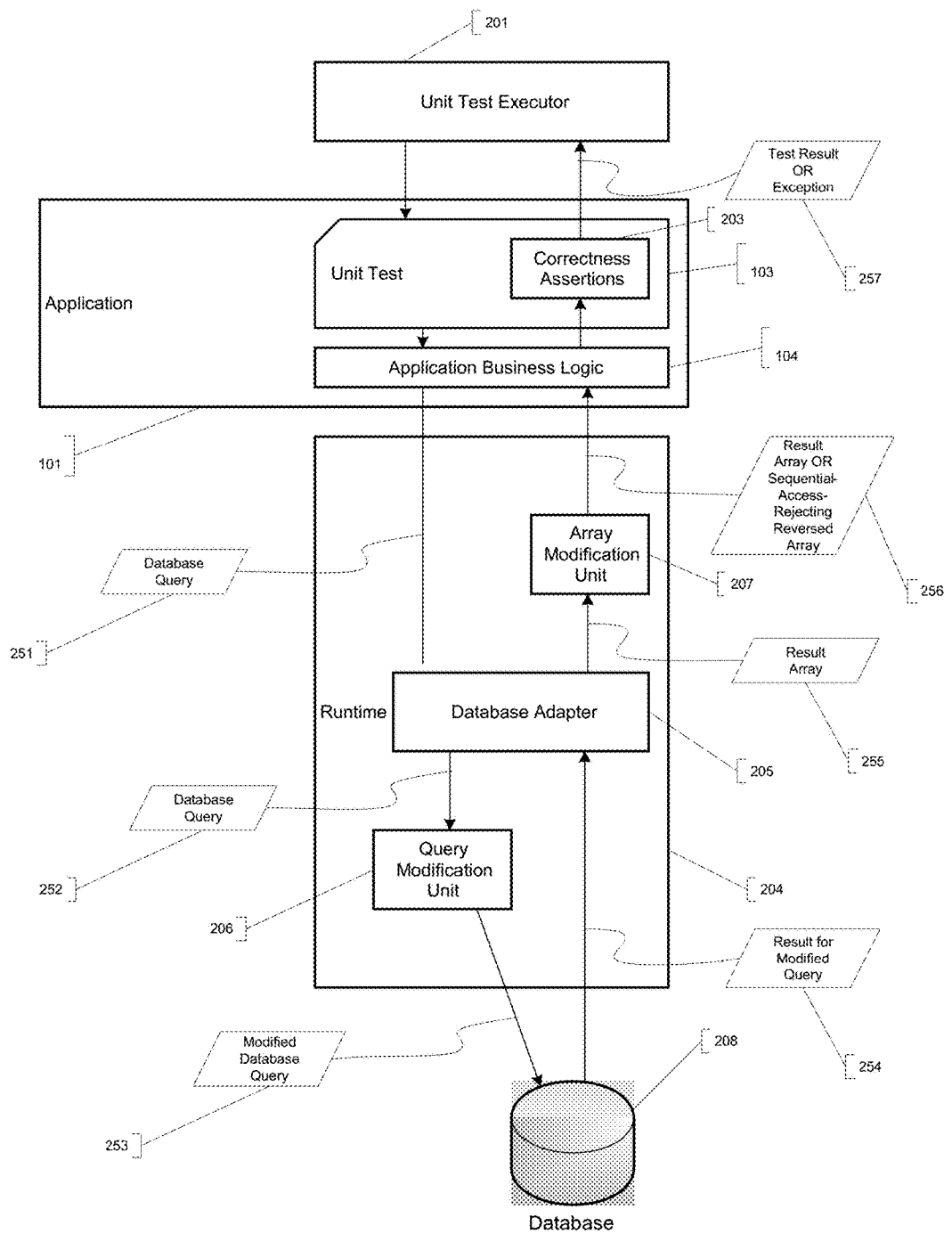
FIG. 2 shows an example of a system for order by detection, in accordance with some example implementations.
Figure 3:
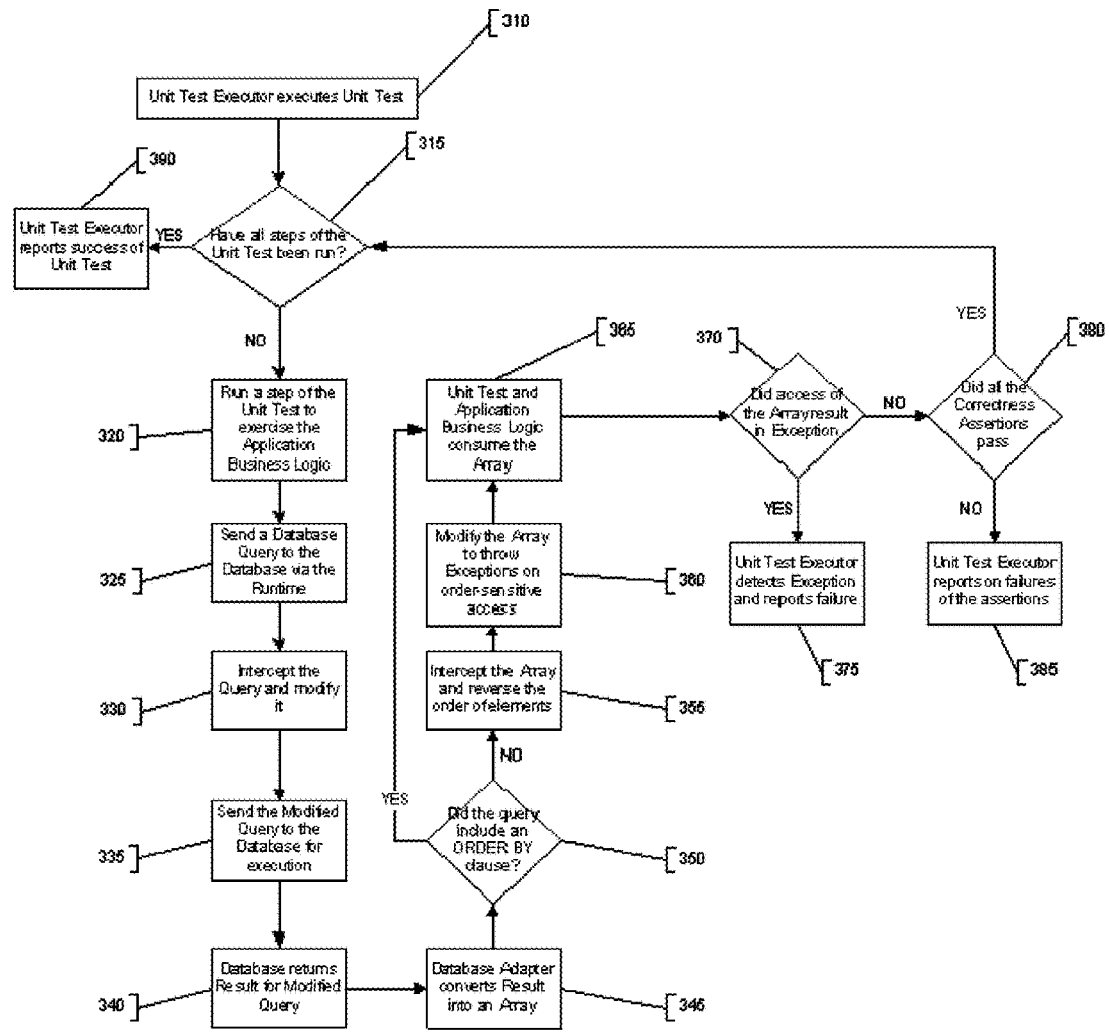
FIG. 3 shows an example of a process for order by detection, in accordance with some example implementations t user interface including a notification.

FIG. 2 depicts an interaction diagram. FIG. 3 depicts a process 300 for detecting order by issues. The description of the interaction diagram of FIG. 2 also refers to FIGS. 1 and 3.

To validate an application 101 for correctness with respect to order by, a unit test 103 may be run on that application. To run a single unit test 103 of the unit test suite 102 for that application, a unit test executor 201 executes a unit test 103.

At 310, unit test executor 201 runs unit test 103. During the course of execution of the unit test 103, unit test 103 runs a portion of the application business logic 104. For example, to run a single unit test 103, unit test executor 201 handles execution of unit test 103. Unit test executor 201 then instructs and/or initiates the unit test 103 to run/execute a step of the unit test unless all of the steps of the unit test have been run (No at 315 and 320).

At 325, application business logic 104 issues one or more database queries 251 to a database adapter 205 in runtime 204. For each database query 251 received by the database adapter 205, the database adapter adapts the query for a specific query language dialect recognized by a database 208, and then sends query 252 to database 208.

At 330, the query modification unit 206 intercepts the query 252 and then modifies the query. For example, the query modification unit 206 may modify query 252, an example of which is as follows:
SELECT*FROM Employees LIMIT 1,
to another, new query 253 which is as follows:
SELECT*FROM Employees LIMIT 2.

The modified query 253 instructs database 208 to return more than one row of data, when available. This modification enables detection of an order by problem (for example, returning a list of one item may not lend itself to order by detection processing, when compared to a longer list).

At 335, the query modification unit 206 sends the modified query 253 to the database 208 for execution. At 340, database 208 returns the query result 254 to the database adapter 205. At 345, database adapter 205 transforms the database result 254 into a structure, such as an array 255. The database adapter 205 sends the array back to the caller, such as application 101.

At 350, the array modification unit 207 intercepts the array being returned 255. If the query 252 contains an order by clause (which means that the database 208 had sorted the query results before returning it), then the array modification unit 207 leaves the array 255 untouched and sends it back to unit test 202. For example, the following query does not contain an order by clause:
SELECT*FROM Employees LIMIT 1.
But the following query does contain an order by instruction:
SELECT*FROM Employees ORDER BY LastName LIMIT 1.

At 355, if the query 252 does not contain an order by clause (no at 350), the array modification unit 207 can modify (for example, reverse) the order of the entries in the array 255. For example, array modification unit 207 may modify (for example, reverse the array order) of the following:
[<Employee 6>, <Employee 2>, <Employee 4>],
to the following:
[<Employee 4>, <Employee 2>, <Employee 6>]. This modification enables detecting whether there is an order by issue with the query. For example, intentionally modifying the order may trigger an exception or error to be thrown to enable detection of the order by issue.

At 360, array modification unit 207 modifies the array to throw exceptions when attempts are made to access the array in an order-sensitive or sequential fashion. For example, accessing the first element of the array, accessing the last element, accessing each element in sequence, and combining the array with another array would all be considered to be order-sensitive operations.

At 365, the array modification unit 207 returns the modified array 256 to the application business logic 104. The application 101 and, in particular, application business logic 104 may then access modified array 256. The application business logic 104 may also pass the modified array back to unit test 202, which in turn may also access the modified array 256.

At 370-375, if the array access results in an exception being thrown (due to for example order-sensitive or sequential access), unit test 202 sends the exception 257 onto the unit test executor 201 to report as a test failure. For example, application business logic 104 may try to access the last element of the array, which is an order-sensitive operation. This causes an exception to be thrown.

At 380-385, if no exceptions are thrown when the array is accessed, then the unit test checks its correctness assertions 203. Since the array elements were reversed by the array modification unit 207, some assertions may fail. If assertions fail, then the failures 257 are sent to the unit test executor 201 for reporting. For example, the unit test may assert that the returned array 257 matches the expected output of:
[<Employee 6>, <Employee 2>, <Employee 4>].
But due to the element reversal performed by the array modification unit 207, array 257 actually has the following form:
[<Employee 4>, <Employee 2>, <Employee 6>]
As such, there is no match and the assertion fails. Here, there is an order by issue/error.

At 390, if no failures or exceptions are sent to the unit test executor 201, then the unit test 203 is considered as a success by the unit test executor.

The following provides an illustrative example. Database 208 may contain a table of "Employees" as shown at Table 1.

TABLE 1

| FirstName | LastName | ID |
|---|---|---|
| John | Doe | 6 |
| Jane | Doe | 2 |
| Joseph | Doe | 4 |

The unit test 202 may consists of for example the following:
employees=Employees.find(:first, "LastName='Doe'")
first_employee=employees.first
assert first_employee.ID==6
The last line of the unit test 202 in this example ("assert first_employee.ID==6") represents the correctness assertion 203 of the unit test 202. Referring to FIG. 3, at 310, unit test executor 201 executes unit test 203. As there is a step to run (yes at 315), the unit test 203 instructs, at 320, the application business logic 104 to run "Employees.find(:first, "LastName='Doe'")." At 325, the application business logic 104 sends the query, SELECT*FROM Employees WHERE LastName='Doe' LIMIT 1, to the database adapter 205. At 330, the query modification unit 206 intercepts the query before it goes to the database 208, and changes it to the following:

SELECT*FROM Employees WHERE LastName='Doe' LIMIT 2.

At 335, query modification unit 206 sends the modified query to the database 208. At 340, the database 208 returns the result at Table 2.

TABLE 2

| FirstName | LastName | ID |
|---|---|---|
| John | Doe | 6 |
| Jane | Doe | 2 |

At 345, the database adapter converts the result into an array (255) having the following form:

[<Employee 6>, <Employee 2>].

At 350, array modification unit 207 finds that the query 252 did not have an order by clause. At 355, the array modification unit 207 intercepts the array 255 and reverses the elements to the following:

[<Employee 2>, <Employee 6>].

At 360, the array modification unit 207 also modifies the reversed array to throw exceptions on order-sensitive access, and then returns the modified array 256 to the application business logic 210.

At 365, the application business logic 104 returns the array 256 to the unit test 202. It then runs: first_employee=employees.first, which is an order-sensitive operation on the array 256 by accessing the first element of the array. As such, the array throws an exception, at 370. At 375, the unit test executor 201 detects the exception and reports it as a test failure.

Without in any way limiting the scope, interpretation, or application of the claims appearing below, a technical effect of one or more of the example embodiments disclosed herein is increase operating efficiency and/or speed of database execution.

As used herein, the term database may refer to a database management system and its associated structured data. Moreover, an order-by controller may be provided in some implementations to detect the order by problem.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively, or additionally, store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including, but not limited to, acoustic, speech, or tactile input. Other possible input devices include, but are not limited to, touch screens or other touch-sensitive devices such as single or multi-point resistive or capacitive track pads, voice recognition hardware and software, optical scanners, optical pointers, digital image capture devices and associated interpretation software, and the like.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A non-transitory computer-readable storage medium including program code that, when executed by at least one programmable processor, causes the at least one programmable processor to perform operations comprising:

intercepting, as part of testing of an application, a query sent by the application to a database, the database comprising a database management system that makes default sort order guarantees;

modifying the query by at least defining the query to return a plurality of results, the modified query enabling detection of whether the query causes an order by error at the application, the order by error representing an error at the application caused by at least the query not including an order by instruction and caused based on at least whether the plurality of results provided by the database to the application are out of order;

sending the modified query to the database;

intercepting a query result provided by the database in response to the modified query, the modified query including the plurality of results;

modifying, in response to the modified query not including the order by instruction, the intercepted query result by at least re-ordering the plurality of results;

sending the re-ordered plurality of results to the application to enable the determination of whether the re-ordered plurality of results cause the order by error at the application; and detecting the query causes the order by error at the application, in response to the re-ordered plurality of results causing the error at the application.

2. The computer-readable storage medium of claim 1, wherein the order by error is related to order-sensitive and/or sequential access, by the application, of the re-ordered plurality of results.

3. The computer-readable storage medium of claim 2, wherein the order by error at the application triggers an exception to be thrown.

4. The computer-readable storage medium of claim 1, wherein the modifying the intercepted query comprises reversing the order of the plurality of results.

5. The computer-readable storage medium of claim 1, wherein the database comprises a column-store database.

6. The computer-readable storage medium of claim 1, wherein the order by instruction orders the query result based on one or more columns of the database.

7. The computer-readable storage medium of claim 1, wherein the query comprises a select query.

8. A method comprising:

intercepting, as part of testing of an application, a query sent by the application to a database, the database comprising a database management system that makes default sort order guarantees;

modifying the query by at least defining the query to return a plurality of results, the modified query enabling detection of whether the query causes an order by error at the application, the order by error representing an error at the application caused by at least the query not including an order by instruction and caused based on at least whether the plurality of results provided by the database to the application are out of order;

sending the modified query to the database;

intercepting a query result provided by the database in response to the modified query, the modified query including the plurality of results;

modifying, in response to the modified query not including the order by instruction, the intercepted query result by at least re-ordering the plurality of results;

sending the re-ordered plurality of results to the application to enable the determination of whether the re-ordered plurality of results cause the order by error at the application; and detecting the query causes the order by error at the application, in response to the re-ordered plurality of results causing the error at the application.

9. The method of claim 8, wherein the order by error is related to order-sensitive and/or sequential access, by the application, of the re-ordered plurality of results.

10. The method of claim 9, wherein the order by error at the application triggers an exception to be thrown.

11. The method of claim 8, wherein the database comprises a column-store database.

12. The method of claim 8, wherein the order by instruction orders the query result based on one or more columns of the database.

13. The method of claim 8, wherein the modifying the intercepted query comprises reversing the order of the plurality of results.

14. The method of claim 8, wherein the query comprises a select query.

15. A system comprising:

at least one physical processor; and at least one memory including program code which when executed by the at least one processor causes operations comprising:

intercepting, as part of testing of an application, a query sent by the application to a database, the database comprising a database management system that makes default sort order guarantees;

modifying the query by at least defining the query to return a plurality of results, the modified query enabling detection of whether the query causes an order by error at the application, the order by error representing an error at the application caused by at least the query not including an order by instruction and caused based on at least whether the plurality of results provided by the database to the application are out of order;

sending the modified query to the database;

intercepting a query result provided by the database in response to the modified query, the modified query including the plurality of results;

modifying, in response to the modified query not including the order by instruction, the intercepted query result by at least re-ordering the plurality of results;

sending the re-ordered plurality of results to the application to enable the determination of whether the re-ordered plurality of results cause the order by error at the application; and detecting the query causes the order by error at the application, in response to the re-ordered plurality of results causing the error at the application.

16. The system of claim 15, wherein the order by error is related to order-sensitive and/or sequential access, by the application, of the re-ordered plurality of results.

17. The system of claim 15, wherein the order by error at the application triggers an exception to be thrown.

18. The system of claim 15, wherein the modifying the intercepted query comprises reversing the order of the plurality of results.

19. The system of claim 15, wherein the database comprises a column-store database.

20. The system of claim 15, wherein the query comprises a select query.

* * * * *